United States Patent [19]

Luo

[11] Patent Number: 4,671,134
[45] Date of Patent: Jun. 9, 1987

[54] AUTOMATIC TRANSMISSION FOR MOTORCYCLES

[75] Inventor: Jih-Tzang Luo, Chu-Tung Cheng, Taiwan

[73] Assignee: Industrial Technology Research Institute, Taiwan

[21] Appl. No.: 777,536

[22] Filed: Sep. 19, 1985

[51] Int. Cl.$^4$ ............................................. F16H 37/00
[52] U.S. Cl. ...................................... 74/689; 74/681; 280/230
[58] Field of Search .................. 74/689, 681, 679; 180/230, 231

[56] References Cited

U.S. PATENT DOCUMENTS

| | | | |
|---|---|---|---|
| 2,974,544 | 3/1961 | Miner | 74/689 |
| 3,152,490 | 10/1964 | Lemieux | 74/689 |
| 3,481,221 | 12/1969 | Gaskins | 74/689 |
| 3,670,594 | 6/1972 | Roper | 74/689 |
| 4,305,488 | 12/1981 | McIntosh | 74/689 |
| 4,354,401 | 10/1982 | Omitsu | 74/689 |
| 4,406,178 | 9/1983 | Gillade | 74/689 |
| 4,589,303 | 5/1986 | Roberts | 74/689 |
| 4,624,153 | 11/1986 | Itoh et al. | 74/689 |

*Primary Examiner*—Lawrence Staab
*Assistant Examiner*—Dwight G. Diehl
*Attorney, Agent, or Firm*—Browdy and Neimark

[57] ABSTRACT

An automatic transmission for motorcycles includes a planetary gear train. The power input is applied to a ring gear of the train by a fixed speed ratio transmission and to a sun gear by a variable speed ratio transmission so that the sun gear rotates in a direction opposite to that of the ring gear. The power is output from the planetary gear carrier. The power output is zero when the pitch line velocity of the ring gear is equal to that of the sun gear. A centrifugal clutch is mounted on the input shaft for engaging fixed speed ratio transmission when the rotational speed of the input shaft reaches a predetermined value. Furthermore, another shaft is disposed parallelly near the input shaft and connected to the input shaft by means of two interengaging gears which are respectively mounted on the two shafts so as to act as a balancing shaft for the crank shaft of the engine.

2 Claims, 2 Drawing Figures

AUTOMATIC TRANSMISSION FOR MOTORCYCLES

BACKGROUND OF THE INVENTION

The invention relates to a infinitely variable transmission, particularly to one for motorcycle.

Currently, some motorcycles include a clutch, a gearing and a set of stepless V-belt pulleys. The rotation of the wheels of such motorcycles must be initiated by the progressive frictional connection of the clutch. This causes power loss and limited accelerating ability and gradeability of the motorcycle.

Planetary gear systems associated with belt pulleys have been used in automobiles, for example, as disclosed in the U.S. Pat. Nos. 3,152,490, 3,670,594 and 4,406,178. These planetary gear systems are useful for automobiles; however, they are unsuitable for motorcycles because of their large volume.

Additionally, as the vibration of motorcycle is a common problem, reduction of the vibration of the crank of motorcycle engines is therefore desired.

SUMMARY OF THE INVENTION

It is therefore an object of the invention to provide an automatic transmission including a planetary gear system, which is suitable for motorcycles.

Another object of the invention is to provide an automatic transmission for motorcycles, the output shaft of which is capable of starting from zero rotational speed so as to generate relatively large torque and to obviate the need for progressive frictional connection of a clutch which causes power loss.

Another object of the invention is to provide an automatic transmission for motorcycles, which can reduce the vibration of the crank of the motorcycle engine.

Still another object of the invention is to provide an automatic transmission for motorcycles which possesses a high reduction ratio in starting to increase the accelerating ability and gradeability of the motorcycles.

According to the invention, an automatic transmission for motorcycles includes a first shaft, driven by a crank of an engine; a first transmission wheel mounted on the first shaft; a centrifugal clutch mounted on the first shaft and connected to the first transmission wheel for engaging a fixed speed ratio transmission with the first shaft when the rotational speed of the first shaft reaches a predetermined value; a second shaft disposed parallelly near the first shaft; a transmission mechanism disposed between the first and second shafts for driving the second shaft to rotate in a direction opposite to that of the first shaft; a compression spring mounted on the second shaft; a first variable V-belt pulley mounted on the second shaft and operated by the compression spring; a third shaft parallel to the second shaft; a centrifugal weight mounted on the third shaft; a second variable V-belt pulley mounted on the third shaft and operated by the centrifugal weight; a V-belt connecting the second variable V-belt pulley to the first variable V-belt pulley for variable speed ratio transmission; a power output shaft coaxial with the third shaft; a planetary gear train, including a sun gear fixed to the third shaft so as to be driven by the two V-belt pulleys to rotate, a ring gear, a planetary gear carrier fixed to the power output shaft, and a plurality of pinion gears meshed between the sun gear and the ring gear, each of the pinion gears having an axle mounted on the planetary gear carrier; a second transmission wheel fixed to the ring gear; and a fixed speed ratio transmission member connecting the second transmission wheel to the first transmission wheel for driving the ring gear to rotate with the first shaft; whereby, the ring gear always rotates in a direction opposite to that of the sun gear so that when the pitch line velocity of the sun gear is equal to that the ring gear, the power output is zero; subsequently, when the rotational speed of the first shaft surpasses the limit of its idle speed, the power is output immediately.

DETAILED DESCRIPTION OF THE PREFERRED EMBODIMENT

Figure 1:
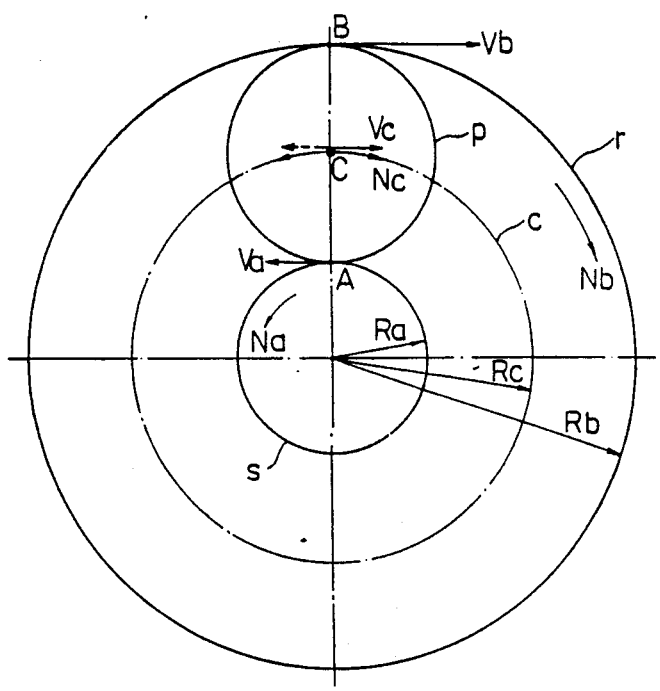
FIG. 1 is a schematic view showing the principle of an automatic transmission for motorcycles according to the invention.

Referring to FIG. 1, a pinion gear P meshes between a sun gear s and a ring gear r at points A & B respectively. The pinion gear P has an axis C, which is supported by a planetary gear carrier c which itself rotates about a point O. The sun gear s is driven to rotate in a first direction with a pitch line velocity Va and acts as a first input member. Ring gear r is driven to rotate in an opposite second direction with a pitch line velocity Vb, and acts as a second input member. Thus, the planetary gear carrier c will rotate in either the first or second directions with a velocity Vc at axis C determined by an equation, $Vc = \frac{1}{2}(Vb - Va)$ and acts as an output member, i.e. when $Vb = Va$, $Vc = 0$; when $Vb > Va$, $Vc > 0$; and when $Vb < Va$, $Vc < 0$.

Given that Ra, Rb & Rc and Na, Nb & Nc respectively represent the rotating radii and angular velocities of the sun gear s, ring gear r and planetary gear carrier c, then, $Nc = (NbRb - NaRa)/2Rc$. Accordingly, as Ra, Rb and Rc is designed to be fixed, Nc is varied as desired when Na or Nb varies by design.

In the invention, the sun gear s and ring gear r are driven by the same power source through respectively a variable speed ratio transmission and a fixed speed ratio transmission. Thus, the rotational speed Nb of the ring gear r varies in a fixed ratio with the rotational speed of the power source, and the rotational speed Na of the sun gear s varies in a variable ratio with the rotational speed of the power source. When the power source rotates at a minimum speed, the relation between Na and Nb is designed so that Nc is zero. When the power source rotates at a speed below the minimum speed, the power is disconnected by means of a centrifugal clutch. When the rotational speed of the power source surpasses the minimum speed, the relation between Na and Nb is designed so that Nc increases gradually.

Figure 2:
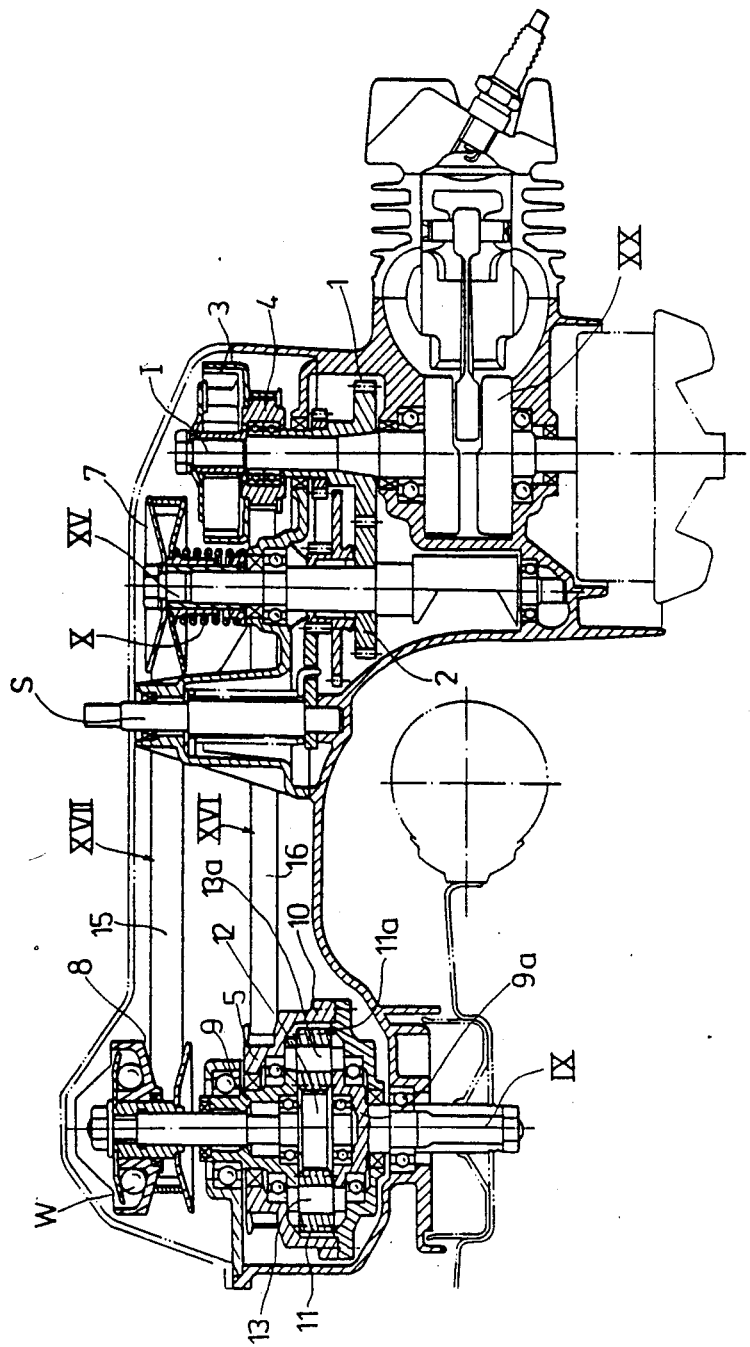
FIG. 2 is a sectional view showing an automatic transmission for motorcycles according to the invention.

FIG. 2 shows a preferred embodiment of the invention. It includes a first shaft I driven by the crank shaft XX of the motorcycle; an active gear 1 fixed to shaft I; a second shaft II parallel to the first shaft I; a reactive gear 2 fixed to the second shaft II and meshed with the active gear 1 so that the second shaft II acts as a balancing shaft for the crank XX of the motorcycle; a first transmission wheel 4 fixed to the first shaft I; a known centrifugal clutch 3, connected to the first transmission wheel 4 for engaging fixed speed ratio transmission with the first shaft I when the rpm of the first shaft I reaches a predetermined value; a compression spring X mounted on the second shaft II; a first variable V-belt pulley 7 mounted on the second shaft II and operated by the compression spring X; a third shaft III parallel to the second shaft II; centrifugal weights W mounted on the third shaft III; a second variable V-belt pulley 8 mounted on the third shaft III and operated by the centrifugal weight W for adjusting automatically the speed variation of the third shaft III; a power output shaft IV coaxial with the third shaft III; a planetary gear carrier 9 & 9a fixed to power output shaft IV; a ring gear 10; a sun gear 12 fixed on the third shaft III; two pinion gears 11 & 11a meshed between the ring gear 10 and the sun gear 12; two pinion axles 13 & 13a respectively mounted on the planetary gear carrier 9 & 9a; a V-belt 15 connecting the V-belt pulleys 7 and 8 for variable speed ratio transmission; a second transmission wheel 5 fixed on the ring gear 10; a fixed speed ratio transmission member 16, such as a belt or a chain, connecting the transmission wheels 4 and 5 for a fixed speed ratio transmission; and a starting shaft S. In idle operation, the centrifugal clutch 3 disengages from the first transmission wheel 4 and the motorcycle wheels mounted securely on the output shaft IV rests on the ground, i.e. the planetary gear carrier 9 & 9a is fixed. Thus, the rotation of the sun gear 12 will rotate the ring gear 10 which in turn, through the fixed speed ratio transmission member 16, will rotate first transmission wheel 4. The first transmission wheel 4 rotates in the same direction as that of the clutch means in the centrifugal clutch 3. The centrifugal clutch 3 engages with the first transmission wheel 4 without friction to rotate synchronously when the rpm of shaft I reaches the predetermined value, i.e. the limit of the idle speed. When the rpm of shaft I surpasses the limit of the idle speed, with the action of the centrifugal weights W which will increase the action radius of the first variable V-belt pulley 8 and decrease the action radius of the V-belt pulley 7, the rpm of sun gear 12 will correspondingly gradually reduced. Thus, an automatic differential transmission is obtained.

It can be noted that a fixed speed ratio transmission member used in the present invention can be a timing belt, a chain or a gear train mounted on the power source and the planetary gear set.

A set of experimental data according to the present invention is as follows:

Given that:

1. the speed ratio of the fixed speed ratio transmission wheels 4 and 5 equals 1:1.8;

2. the speed ratio of the variable speed ratio transmission pulleys 7 and 8 ranges from 1.25:1 to 1:1.2 intermittently corresponding to the rpm of the crank shaft XX ranging from 2500 to 4500, i.e. 2500 rpm is the limit of idle speed of the crank shaft XX and the speed ratio of the variable speed ratio transmission pulleys is maintained at 1:1.2 if the rpm of the crank shaft XX is higher than 4500; and 3. the tooth ratio of sun gear 12 and ring gear 10 is 4:9; then, the output of the power output shaft IV is gradually increased from zero to 577 rpm when the rpm of the crank shaft XX is increased from zero to 4500, i.e. the reduction ratio between the first shaft I and output shaft IV, ranging from infinity to 0.13, varies according to the small speed ratio variation of the variable speed ratio transmission pulleys which ranges from 1.25 to 0.83. The motorcycle incorporating with the present invention is easy to start because of such the high reduction ratio of the transmission when it starts to output.

From the above description, the following advantages for the present invention can be inferred:

1. The accelerating ability and the gradability of a motorcycle incorporating with the present invention are improved because of the high reduction ratio of the transmission.

2. With the differential output in a planetary gear train, the speed of the output is certainly reduced, which eliminates the usage of reduction gear assemblies as needed in the conventional transmission.

3. The a motorcycle incorporating the present invention does not cause power loss since the friction loss of the clutch of the conventional transmission is avoided.

4. The second shaft II acts as a balancing shaft of the crank shaft XX; thus, the vibration of the motorcycle incorporating the invention is reduced to increase the comfort of the ride.

While the present invention has been described in the preferred embodiment, it is to be understood that within the scope of the appended claims, the invention may be practiced otherwise than as described.

What I claim is:

1. An automatic transmission for motorcycles comprising:

a first shaft, driven by a crank of an engine;

a first transmission wheel mounted on said first shaft;

a centrifugal clutch mounted on said first shaft and connected to said first transmission wheel for engaging fixed speed ratio transmission with said first shaft when the rotational speed of said first shaft reaches a predetermined value as the idle speed of the engine;

a second shaft disposed parallelly near said first shaft;

a transmission mechanism disposed between said first and second shafts for driving said second shaft to rotate in an opposite direction to and with the same rotational speed with that of said first shaft;

a compression spring mounted on said second shaft;

a first variable V-belt pulley mounted on said second shaft and operated by said compression spring;

a third shaft parallel to said second shaft;

a centrifugal weight mounted on said third shaft;

a second variable V-belt pulley mounted on said third shaft and operated by said centrifugal weight;

a V-belt connecting said second V-belt pulley to said first V-belt pulley for variable speed ratio transmission;

a power output shaft coaxial with said third shaft;

a planetary gear train, including a sun gear fixed to said third shaft so as to be driven by said two V-belt pulleys to rotate, a ring gear, a planetary gear carrier fixed to said power output shaft, and a plurality of pinion gears meshed between said sun gear and said ring gear, each of said pinion gears having an axle mounted on said planetary gear carrier;

a second transmission wheel fixed to said ring gear; and a fixed speed ratio transmission member connecting said second transmission wheel to said first transmission wheel for driving said ring gear to rotate with said first shaft;

whereby, said ring gear always rotates in an opposite direction to that of said sun gear so that when the rotational speed of said first shaft reaches said idle speed, the pitch line velocity of said sun gear is equal to that of said ring gear, and the power output is zero; subsequently, when the rotational speed of said first shaft surpasses said idle speed, the power is output immediately.

2. An automatic transmission as claimed in claim 1, wherein said transmission mechanism disposed between said first and second shafts include an active gear fixed to said first shaft, and a reactive gear fixed to said second shaft and meshed with said active gear.

* * * * *